A. C. DIEHL.
SOUND BOX.
APPLICATION FILED AUG. 31, 1910.

1,156,217.

Patented Oct. 12, 1915.
5 SHEETS—SHEET 1.

INVENTOR
Albert C. Diehl.

WITNESSES

BY

ATTORNEY

A. C. DIEHL.
SOUND BOX.
APPLICATION FILED AUG. 31, 1910.

1,156,217.

Patented Oct. 12, 1915.
5 SHEETS—SHEET 2.

INVENTOR
Albert C. Diehl.

A. C. DIEHL.
SOUND BOX.
APPLICATION FILED AUG. 31, 1910.

1,156,217.

Patented Oct. 12, 1915.
5 SHEETS—SHEET 3.

INVENTOR
Albert C. Diehl.

WITNESSES

BY

ATTORNEY

UNITED STATES PATENT OFFICE.

ALBERT C. DIEHL, OF CAMDEN, NEW JERSEY, ASSIGNOR TO VICTOR TALKING MACHINE COMPANY, A CORPORATION OF NEW JERSEY.

SOUND-BOX.

1,156,217.  Specification of Letters Patent.  Patented Oct. 12, 1915.

Application filed August 31, 1910. Serial No. 579,835.

*To all whom it may concern:*

Be it known that I, ALBERT C. DIEHL, a citizen of the United States, and a resident of Camden, in the county of Camden and State of New Jersey, have invented certain new and useful Improvements in Sound-Boxes, of which the following is a specification, reference being had to the accompanying drawings.

This invention particularly relates to the mounting which supports the stylus needle, and which is connected with the diaphragm by a stylus bar in sound boxes for recording and reproducing machines.

The principal objects of this invention are, to provide a simple and efficient stylus mounting, wherein the number of separable parts is reduced to a minimum; to provide a stylus mounting wherein the axis of oscillation of the vibratory portion is invariable; to provide a stylus mounting with a reduced region which substantially approaches a knife edge, and which supports the vibratory portion of said mounting, independent of other retaining means; to provide a stylus mounting wherein the rigid and vibratory portions are formed of a unitary structure, capable of a limited oscillatory movement; and to provide means to limit the range of oscillation of the vibratory portion of said mounting.

Other objects of this invention are, to mount the sound box in substantially horizontal position to reduce the height of said sound box, and to permit a reduction of the casing in which it is to be inclosed; and to dispose the sound conduit adjacent to the edge of the sound box, local to the needle mounting, to balance the weight of said box on said needle, in a position for the convenient attachment of the gooseneck therewith.

The form of this invention hereinafter described provides a sound box with a stylus mounting connected with the diaphragm of said sound box by a stylus bar and comprising a holder for the stylus needle; a support secured to said sound box casing and connected with the holder by posts which are provided with notches having converging walls approaching substantially a knife edge, to form a thin web, providing a fulcrum; a projection extending between said posts rigidly secured to one part of said mounting and extending adjacent to the other part of said mounting, and arranged to prevent such relative movement of the parts as would tend to fracture said posts on the fulcrum line of connection between said parts; and provides a mounting, arranged to hold a stylus needle in transverse relation to the plane of the diaphragm.

This invention further includes all of the various novel features of construction and arrangement hereinafter more definitely specified.

In the accompanying drawings.

Figure 1:
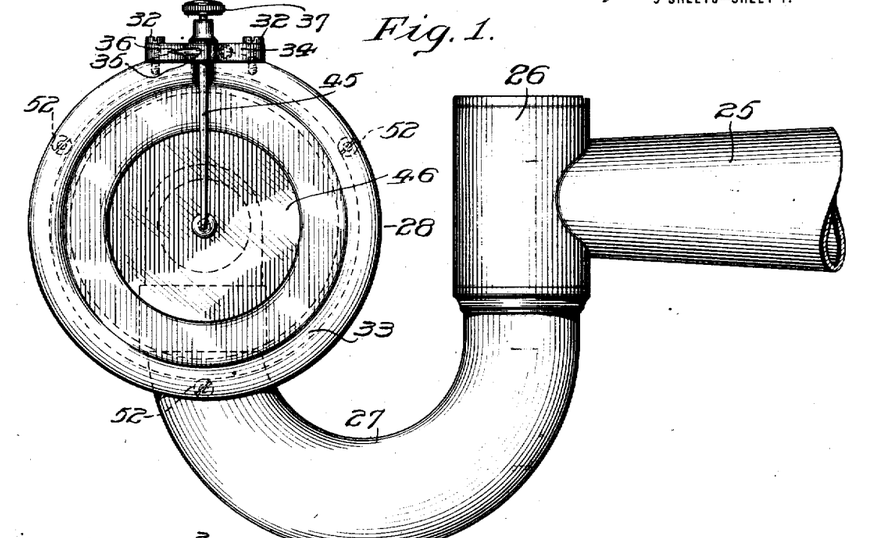
Figure 1 is an inverted plan view of a horizontal sound box, showing the preferred embodiment of this invention, mounted upon the gooseneck of the swinging arm of a talking machine.
Figures 2, 3, 4:
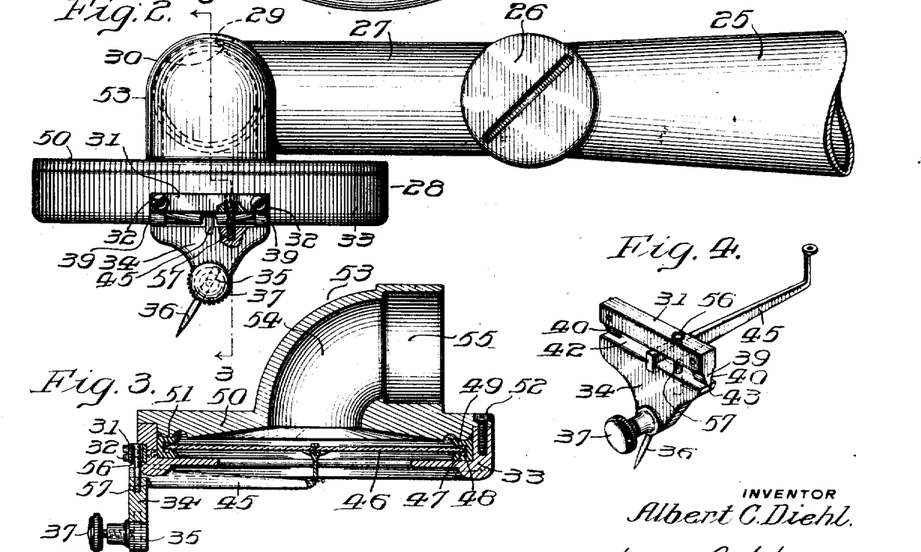
Fig. 2 is a side elevational view of said sound box, together with a gooseneck and swinging arm shown in Fig. 1.
Fig. 3 is a central vertical sectional view of said sound box, taken on the line 3—3 in Fig. 2.
Fig. 4 is a perspective view of the stylus mounting.

In the embodiment of this invention shown in Figs. 1 to 4, inclusive, the swinging arm 25 carries the pivot barrel 26, which supports the gooseneck 27, upon the free end of which the sound box 28 is removably attached by a bayonet joint connection comprising the slot 29 and the pin 30, in the usual manner. The stylus bar mounting comprises the supporting bar 31, which is secured by the screws 32 to the sound box casing 33, and which has the stylus holder 34 provided with the socket 35 arranged to receive the stylus needle 36, which is secured therein by the thumb-screw 37. Said holder 34 is formed in unitary relation with the supporting bar 31, and is connected therewith by the flexible posts or connectors 39, which, as best shown in the perspective view in Fig. 4, have their opposite sides 40 tapered in planes converging to a shoulder 42, which is preferably coincident with the upper wall of the stylus holder 34 and the sides 40. Said posts 39 approach substantially a knife edge which is joined by a narrow web of material 43 to the holder 34, thus rendering it capable of relative vibratory motion with respect to the posts 39 and supporting bar 31. The holder 34 carries the stylus bar 45, the end of which is supported between the posts or connectors 39 in a plane with the axial line or the fulcrum of oscillation, and extends inwardly, and is engaged with the diaphragm 46. Said diaphragm 46 is disposed within the casing 33 and has its peripheral margin held by the gasket 47, which is provided with a channel 48 forming sharpened shoulders, the edges 49 of which engage the opposite faces of said diaphragm 46, and, as best shown in Fig. 3, a free space surrounds the edge of said diaphragm 46, when pressed against its seat, provided in the casing therefor, as shown in Fig. 4. The diaphragm 46 is held in the casing 33 by the cap plate 50, which is provided with a ridge 51 arranged to engage the side of said gasket 47 in a region disposed between the edges thereof, and said cap plate 50 is engaged with the sound box casing 33 by the screws 52. The cap plate 50 includes the boss 53, which provides the sound conduit 54 and the socket 55 arranged to receive the free end of the gooseneck 27.

It is obvious that the thin web formed by the approaching sides 40 of the posts 39 may be easily fractured by bending the vibratory stylus holder 34 with respect to the supporting bar 31, beyond the elastic limit of the material of which it is formed, and therefore it is deemed advisable to provide means to prevent such relative movement of the stationary and vibratory parts of the stylus mounting by providing a stud 57, as best shown in Fig. 4. Said stud 57 is secured in the holder 34, and projects upwardly through the aperture 56, which extends through the stylus support 31 and which affords a limited free space surrounding said stud for the normal vibration of said stylus holder. It will be noted that any abnormal distortion of said holder 34 with respect to the supporting bar 31 will be prevented by engagement of the stud 57 with the walls of the aperture 56.

In the form of this invention shown in the figures above described, the stylus needle is disposed in a vertical plane, and in oblique relation to the diaphragm, and the sound box is adapted to be operatively disposed in a horizontal position, whereby the height of the talking machine closure may be reduced.

Figure 5:
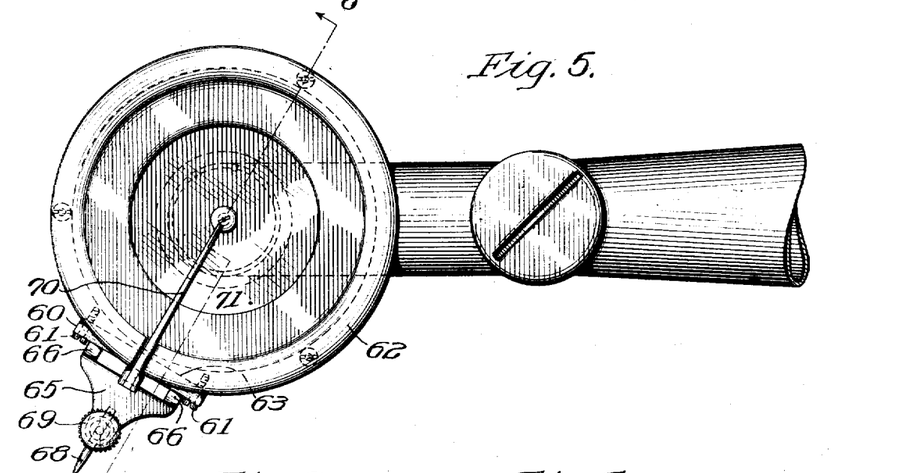
Fig. 5 is a side elevational view, showing a convenient embodiment of this invention as applied to a sound box having its diaphragm disposed in a vertical plane.
Figure 6:
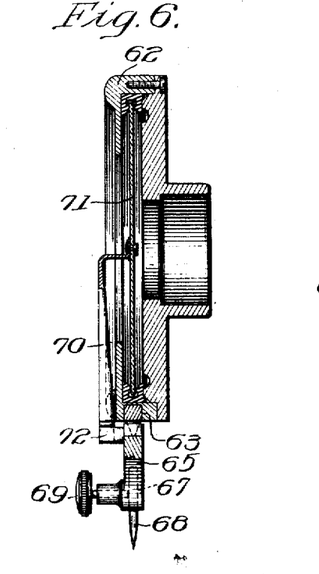
Fig. 6 is a central sectional view taken on the line 6—6 in Fig. 5.
Figure 7:
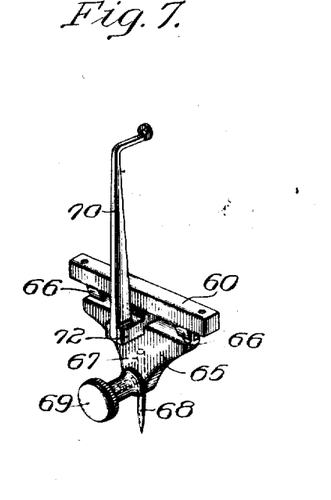
Fig. 7 is a perspective view of the stylus mounting shown in Figs. 5 and 6.
Figure 8:
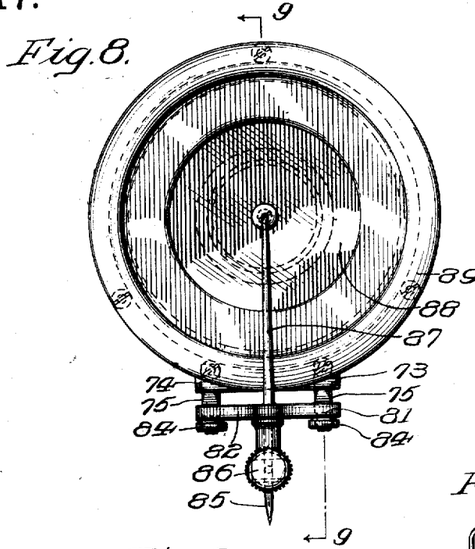
Fig. 8 is a side elevational view of a sound box conveniently embodying a modified form of stylus mounting adapted to a vertically disposed sound box.

The form of this invention shown in Figs. 5 to 7, inclusive, is particularly adapted to the vertical type of sound box and comprises the supporting bar 60, which is secured by the screws 61 to the sound box casing 62, which is provided with the slot 63 for the convenient reception of said supporting bar 60. Said bar 60 is in unitary relation with the stylus holder 65 and is connected therewith by the tapered posts 66, and is similar in construction to the form of stylus mounting shown in Figs. 1 to 4, inclusive. Said holder comprises the socket 67 for the stylus needle 68, which is secured therein by the set screw 69. The stylus bar 70 is connected with the diaphragm 71 at one end and is engaged at the other end with the lateral projection 72 which extends outwardly from the stylus holder 65 and is provided with a portion projecting from said holder 65 between the posts 66, and extending adjacent to the supporting bar 60, and in such close relation without touching said bar as to prevent the distortion of the holder 65 with respect to the supporting bar 60 beyond the limit of elasticity of the material of which it is constructed, whereby a fracture of the web of material forming the fulcrum between the stationary bar 60 and the stylus holder 65 is impossible. It will be noted that in the form of mounting shown in Figs. 5 to 7, inclusive, the stylus needle 68 is substantially in the plane of the diaphragm 71.

In the form of this invention shown in Figs. 8 to 11, inclusive, the stylus mounting is formed of separable parts and comprises the supporting bar 73, which is secured in the casing and which is provided with sockets 74 for the flexible posts 75. The posts 75 are notched upon opposite sides forming oppositely tapered surfaces 76, which terminate in close relation at the shoulder 77 to form a narrow web of material 78, which permits relative vibration of their opposite ends. The lower ends of the posts 75 are fitted in the sockets 80 having ledges 81, in the stylus holder 82, and said posts 75 are provided with the reduced threaded portions 83 in threaded engagement with the nuts 84, which rigidly secure said stylus holder 82 to said posts, with the shoulder formed by said reduced portion in engagement with the ledges 81 in said holder. The stylus holder 82 carries the stylus needle 85, which is secured therein by the set screw 86 and said holder 82 is connected by the stylus bar 87 with the diaphragm 88 within the sound box casing 89.

Figures 9, 10:
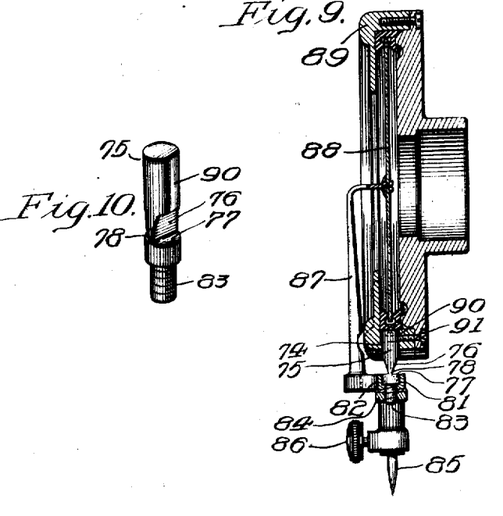
Fig. 9 is a central sectional view of the sound box shown in Fig. 8, taken on the line 9—9 in said figure.
Fig. 10 is a perspective view of one of the flexible posts which connects the needle holder with the mounting support.
Figure 11:
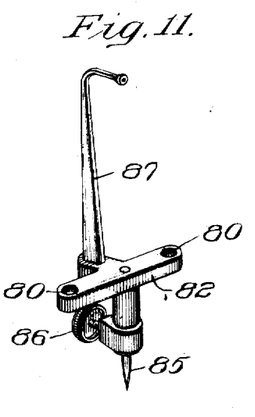
Fig. 11 is a perspective view of the stylus mounting shown in Figs. 8 and 10.
Figures 18, 19, 20, 21:
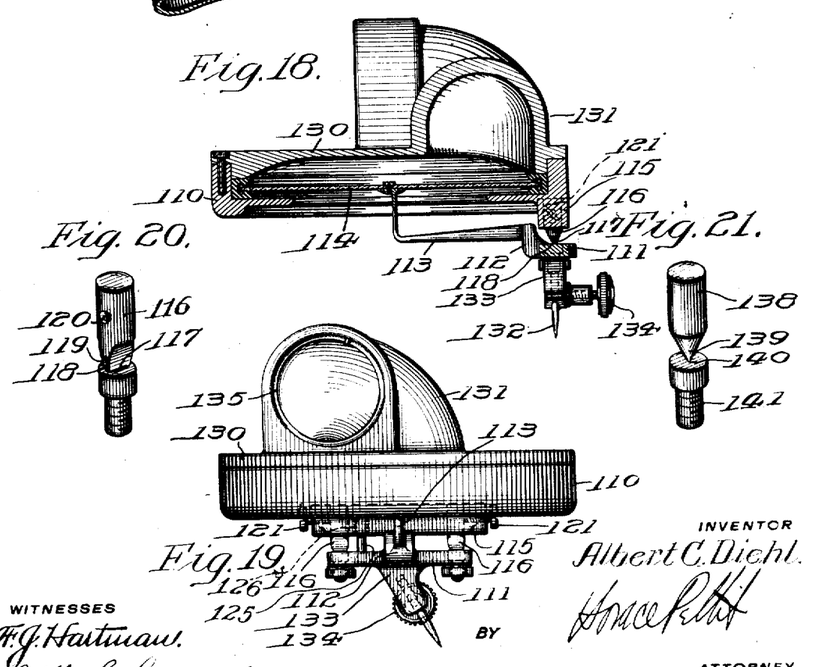
Fig. 18 is a sectional view of the sound box shown in Fig. 17, taken on the line 18—18 in said figure.
Fig. 19 is a side elevational view of the sound box shown in Figs. 17 and 18, showing a slightly modified construction of the flexible posts.
Fig. 20 is a perspective view of one of the flexible posts shown in Figs. 18 and 19.
Fig. 21 is a modification of the post shown in Fig. 20.

It may be here noted that it is essential that the webs forming the fulcrum of the respective posts be in a common plane, and therefore the post 75, shown in Fig. 10, has the flattened surface 90, for the engagement of the retaining screw 91. It is obvious, however, that said post may be spot-faced, as shown in Fig. 20, which is to be hereinafter described.

Figures 12, 13, 14, 15, 16:
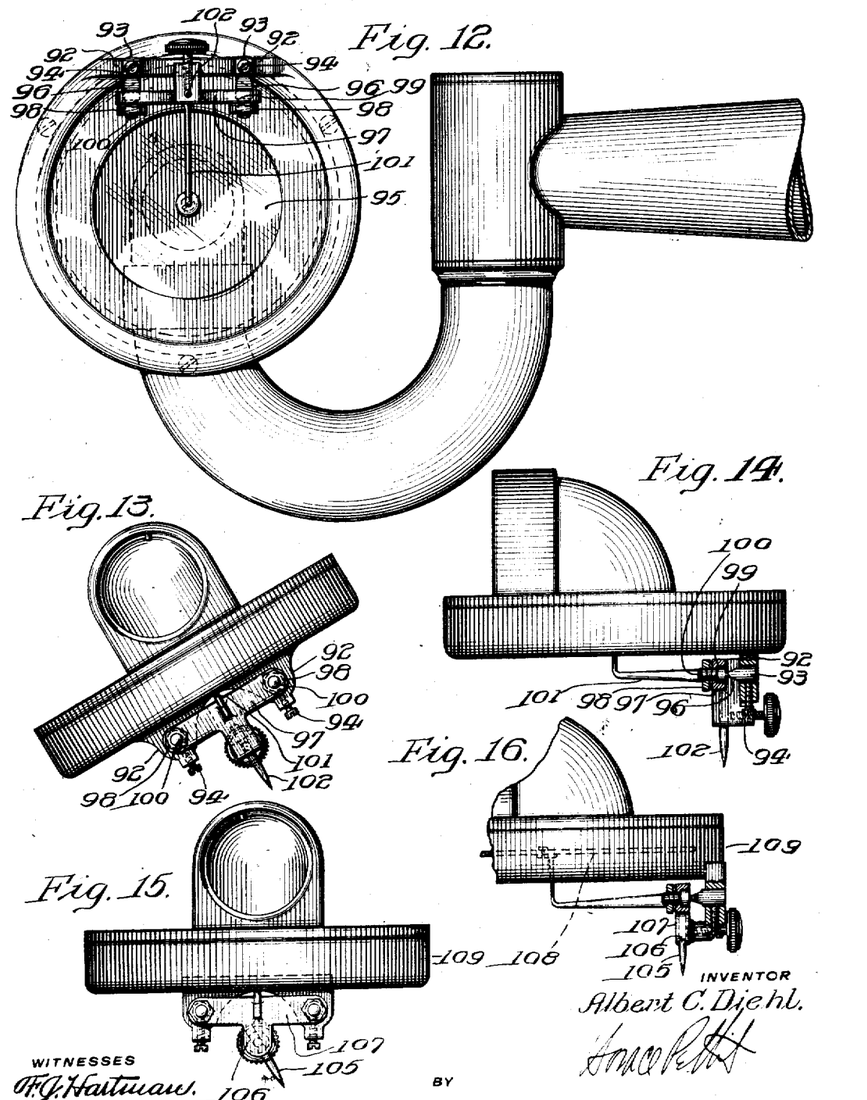
Fig. 12 is an inverted plan view of the horizontal form of sound box embodying the form of flexible connector shown in Fig. 10.
Fig. 13 is an elevational view of the sound box shown in Fig. 12.
Fig. 14 is a side elevation and partial sectional view of the sound box shown in Figs. 12 and 13.
Fig. 15 is a side elevational view showing a sound box and a mounting embodying another form of this invention.
Fig. 16 is a fragmentary sectional elevation of the sound box and mounting shown in Fig. 15.

In the form of this invention shown in Figs. 12 to 14, inclusive, the sound box is provided with lugs 92, having suitable sockets arranged to receive the flexible posts 93, which are secured therein by the screws 94. Said posts 93 have their axes extending substantially in a plane parallel with the plane of the diaphragm 95, and have their sides notched to form a fulcrum line or web 96, upon which the stylus holder 97 may oscillate; said holder 97 being secured to said posts 93 by the nuts 98, which rigidly secure said holder against the shoulders 99 formed on said posts by the reduced threaded ends 100.

It will be noted that in the construction shown in Figs. 12 to 14, inclusive, the distance between the end of the stylus bar 101, which is connected with the diaphragm 95 and the stylus needle 102, is very materially reduced as compared with the sound boxes above described. Furthermore, as best shown in Fig. 13, the axis of the stylus needle 102 is perpendicular to the plane of the diaphragm 95, and therefore the sound box assumes the inclined position shown in said figure when operatively engaged with a sound record disk.

In the form of this invention shown in Figs. 15 and 16, the stylus needle 105 is disposed in the socket 106 in the stylus holder 107 in an oblique relation to the plane of the diaphragm 108, whereby the sound box 109 is maintained in a horizontal position, as best shown in Fig. 15, when engaged with a sound record disk. In other respects the mounting shown in Figs. 15 and 16 is similar to the mounting shown in Figs. 12 to 14, inclusive.

Figure 17:
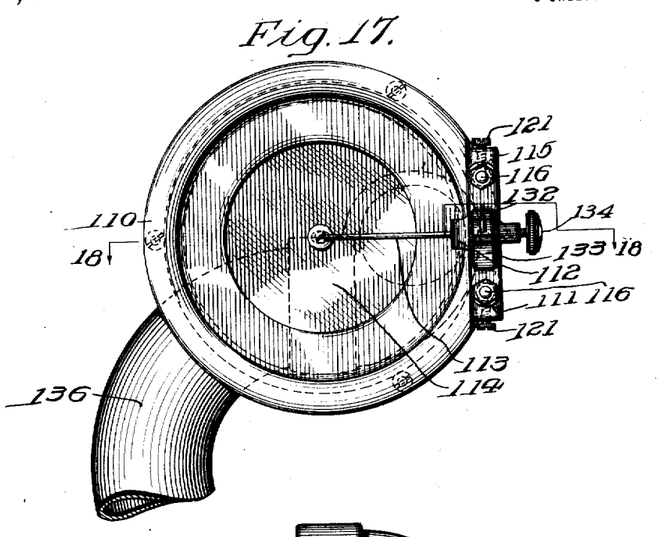
Fig. 17 is an inverted plan view of another form of sound box and stylus mounting.

The form of this invention shown in Figs. 17 to 20, inclusive, provides a sound box casing 110 with a mounting 111 which is provided with an upwardly and inwardly extending lug 112 supporting the stylus bar 113, which is carried by said mounting 111 and secured to the diaphragm 114. Said mounting 111 is connected with the supporting bar 115 by the flexible posts 116, the axes of which extend in a plane perpendicular to the plane of the diaphragm 114, and said posts 116 are each oppositely notched to form approaching surfaces 117 which form a fulcrum web 118 extending transverse to the stylus bar 113, and said posts 116 are notched to form approaching surfaces 119 in planes in transverse oblique relation to the fulcrum axis. The flexible post 116, shown in Fig. 20, is provided with a spot face 120 for engagement of the retaining screws 121, whereby the alinement of the fulcrum webs of the respective posts when assembled is insured. It has been found that in connecting sound boxes which fit the free end of the gooseneck loosely, the sound box tends to cant, which shifts the stylus needle in oblique relation to a vertical plane which is tangent to the spiral groove of the sound record disk, whereby the needle tends to cut away said groove and to thereby destroy the walls of the record groove. The sound box shown in Figs. 17 to 19, inclusive, is constructed to obviate the above difficulties and includes a backplate 130 comprising a boss 131, having a sound conduit extending therethrough, which is disposed at the edge of said sound box, whereby the weight of said boss 131 is disposed as near as possible over the center of gravity of the stylus needle 132, which is carried by the stylus holder 133 and secured thereto by the set screw 134. The stylus mounting 111 is prevented from rocking beyond a predetermined limit by the stud 125, which is secured in the vibratory member of said mounting and projects loosely into the aperture 126 in the stationary member, similar to the stud 57 shown in Figs. 1 to 4, inclusive. As best shown in Fig. 17, the boss 131 is curved substantially eccentric with the edge of the plate 130 and is provided with the socket 135, which is disposed adjacent to the edge of the sound box so as to permit the convenient attachment of the gooseneck 136.

In the form of this invention shown in Fig. 21, the flexible post 138 has a conical waist portion 139 terminating in the shoulder 140, and is provided with the threaded reduced portion 141 for its convenient attachment to a stylus holder.

It has been found that the best results have been achieved by increasing the space between the diaphragm and the inner wall of the sound box casing toward the center or toward the region of the diaphragm which has the greatest freedom of vibration, and, therefore, as shown in Fig. 3, the inner surface of the plate 50 has substantially conical depression, and, as shown in Fig. 18, the plate 130 is dished.

It may be here noted that the form of stylus mounting herein set forth is an improvement over the form of stylus mounting wherein the separate members, one providing a flat surface against which the knife edge of the other bears, are adapted to be held by separate spring members, which spring members are liable to permit a slight relative movement of the knife edge upon its supporting surface, which effects a wearing away of the said knife edge and the contiguous bearing surface; it is obvious that no relative displacement of the stationary and vibratory members is possible, and that any wear consequent upon relative movement of the members is impossible in the structure herein shown.

It may be observed that the spring members necessary to hold together the separate parts of mounting heretofore constructed are eliminated by the integral construction herein shown.

Although the preferred embodiment of this invention provides a flexible post which is oppositely tapered upon but two sides, and provides a line of material substantially approaching a knife edge, upon which the stylus holder is fulcrumed, it may be noted that in view of the forms shown in Figs. 20 and 21, other forms of flexible posts may be suggested which will obviously fall within the scope of this invention, and for this reason it is not desired to limit this invention to the precise details of construction and arrangement herein set forth, as it is obvious that various modifications may be made therein without departing from the essential features of the invention as defined in the appended claims.

Having thus described my invention, I claim:

1. A stylus mounting formed of a unitary piece of material having a central aperture forming spaced posts, the opposite sides of which are provided with recesses having sloping walls which approach substantially a knife edge and form a flexible web connection of negligible thickness between the parts of said mounting which are disposed upon the opposite sides thereof.

2. A stylus mounting comprising stationary and vibratory portions, formed of a unitary piece of material and provided with a central aperture forming spaced posts connecting the stationary portion of said mounting with the vibratory portion of said mounting, and having notches disposed in the opposite sides of said posts, and providing gradually converging walls which approach substantially a knife edge, and which abruptly diverge therefrom to provide a fulcrum the axis of oscillation of which is invariable.

3. A stylus mounting comprising a stationary support, and a relatively vibratory needle holder joined in unitary relation therewith by flexible connectors having angular notches forming shoulders, and providing reduced regions adjacent to said shoulders which form a fulcrum the axis of oscillation of which is invariable.

4. A stylus mounting comprising a unitary structure forming a needle holder and a stationary support joined by a flexible connection having opposed notches, the angles of which provide a fulcrum forming an axis of oscillation which is invariable, and means to prevent the oscillation of said needle holder beyond a predetermined limit.

5. A stylus mounting comprising a unitary structure forming a needle holder and a stationary support joined by a flexible connection having angular recesses, the opposed angles of which provide a fulcrum the axis of oscillation of which is invariable, and means carried by one of said members and extending in close proximity to the other of said members, operative to prevent relative distortion of said members beyond a predetermined range of movement.

6. A stylus bar mounting comprising a needle holder and a stationary support joined by a flexible connection having angular notches, the opposed angles of which provide a fixed fulcrum for the relative oscillation of said holder and its support, and a projection on said holder extending in spaced relation to said support, arranged to engage said support to prevent distortion of said needle holder beyond a predetermined range of movement.

7. A stylus mounting comprising a stationary support and a needle holder joined thereto by flexible connectors having recesses forming reduced regions which provide an invariable fulcrum axis for the relative oscillation of said needle holder and stationary support, and a projection carried by said holder extending in spaced relation in close proximity to said support, and arranged to engage said support to prevent said holder from being distorted with respect thereto beyond its limit of elasticity.

8. A stylus mounting comprising a stationary support, and a needle holder joined therewith by a flexible connector having opposed converging walls, approaching substantially a knife edge, and abruptly diverging therefrom to form angles which provide a fulcrum the axis of oscillation of which is invariable.

9. A stylus mounting formed of a unitary piece of substantially inflexible material having an aperture forming spaced posts, the opposite sides of which are provided with recesses having sloping walls which approach substantially a knife edge to form a flexible connection between the parts of said mounting which are disposed upon the opposite sides thereof.

10. A stylus mounting comprising a stationary portion and a vibratory portion, formed of a unitary piece of material and provided with an aperture forming spaced posts connecting the stationary portion of said mounting with the vibratory portion, and having notches in said posts forming walls which substantially approach a knife edge and which abruptly diverge therefrom to provide a fulcrum, whose axis of oscillation is invariable.

11. A stylus mounting, comprising a stationary support, and a needle holder joined thereto by flexible connectors having reduced regions which provide a fulcrum for the relative oscillation of said needle holder and its support and having a projection extending from said holder in close proximity to said support and arranged to prevent said holder being distorted from a predetermined range of movement.

12. The combination with a relatively stationary support, of a comparatively rigid needle holder, and a connector joining said support and said holder and forming therewith a unitary structure, said connector having opposed converging walls approaching and almost meeting in an imaginary knife edge, and said structure having walls diverging abruptly from said first-mentioned walls, forming oppositely disposed substantially sharp corners therewith, and providing a flexible region in said connector between said corners, whereby said stylus holder is mounted to oscillate upon a substantially invariable axis approximately coincident with said imaginary knife edge.

13. The combination with a relatively stationary support, of a stylus holder spaced therefrom, and spaced connectors joining said support and said holder and forming therewith a unitary structure, each of said connectors having opposed converging walls approaching and nearly meeting in an imaginary knife edge, and said structure having walls diverging abruptly from said first mentioned walls of each of said connectors and forming therewith comparatively sharp corners providing flexible regions in said connectors between said corners and whereby said stylus holder is mounted to oscillate upon a substantially invariable axis approximately coincident with said imaginary knife edge.

14. A stylus mounting comprising a relatively stationary support, a stylus holder, and flexible means connecting said holder to said support, said flexible means having opposed converging walls approaching a knife edge and said mounting including walls diverging abruptly from said knife edge to form with said converging walls, angles which provide a fulcrum of oscillation which is substantially invariable.

In witness whereof, I have hereunto set my hand this 29th day of August, A. D., 1910.

ALBERT C. DIEHL.

Witnesses:
FRANK B. MIDDLETON, Jr.,
CHARLES F. WILLARD.

It is hereby certified that in Letters Patent No. 1,156,217, granted October 12, 1915, upon the application of Albert C. Diehl, of Camden, New Jersey, for an improvement in "Sound-Boxes," an error appears in the printed specification requiring correction as follows: Page 5, lines 19–20, claim 10, strike out the words "whose axis of oscillation is invariable" and insert the words *the axis of oscillation of which is invariable;* and that the said Letters Patent should be read with this correction therein that the same may conform to the record of the case in the Patent Office.

Signed and sealed this 30th day of November, A. D., 1915.

[SEAL.]

J. T. NEWTON,
*Acting Commissioner of Patents.*

Cl. 181—11.